United States Patent [19]

Mattison

[11] Patent Number: 4,777,756
[45] Date of Patent: * Oct. 18, 1988

[54] FISHING JIG AND METHOD OF MAKING SAME

[76] Inventor: Robert N. Mattison, 5826 McKinley Pl. North, Seattle, Wash. 98103

[*] Notice: The portion of the term of this patent subsequent to Jun. 16, 2004 has been disclaimed.

[21] Appl. No.: 47,864

[22] Filed: May 8, 1987

Related U.S. Application Data

[63] Continuation of Ser. No. 835,104, Feb. 28, 1986, Pat. No. 4,672,766, which is a continuation-in-part of Ser. No. 607,284, May 4, 1984, Pat. No. 4,589,221, Ser. No. 648,458, Sep. 7, 1984, Pat. No. 4,581,839, and Ser. No. 813,677, Dec. 23, 1984, Pat. No. 4,693,032.

[51] Int. Cl.⁴ .............................................. A01K 85/01
[52] U.S. Cl. ..................................... 43/17.6; 43/42.06
[58] Field of Search ................... 43/44.9, 42.36, 17.5, 43/17.6, 42.06, 42.09

[56] References Cited

U.S. PATENT DOCUMENTS

| | | |
|---|---|---|
| 272,317 | 2/1883 | Pflueger . |
| 756,438 | 4/1904 | Uhlenhart . |
| 990,984 | 5/1911 | Immell ................................ 43/44.9 |
| 1,982,573 | 11/1934 | Coyne ................................ 43/44.9 |
| 2,117,206 | 5/1938 | Neff . |
| 2,674,058 | 4/1954 | Lindenberg . |
| 2,693,049 | 11/1954 | Atton ................................ 43/44.9 |
| 2,791,058 | 5/1957 | Bettini . |
| 2,797,517 | 7/1957 | Eriksen . |
| 3,096,599 | 7/1963 | Baron ................................ 43/44.9 |
| 3,413,749 | 12/1968 | Jeffers . |
| 3,434,230 | 3/1969 | Littlefield . |
| 3,568,354 | 2/1969 | Yacko . |
| 3,576,987 | 5/1971 | Voight et al. . |
| 3,579,895 | 5/1971 | Orn et al. . |
| 3,597,362 | 8/1971 | Bollyky et al. . |
| 3,708,903 | 1/1973 | Bercz et al. . |
| 3,762,092 | 10/1973 | Bercz et al. . |
| 3,803,749 | 4/1974 | Boyum ................................ 43/44.9 |
| 3,861,072 | 1/1975 | Holcombe . |
| 3,863,380 | 2/1975 | Purlia . |
| 3,895,455 | 7/1975 | Johnston . |
| 3,918,190 | 11/1975 | Hornbeck . |
| 3,921,328 | 11/1975 | Holcombe . |
| 3,940,868 | 3/1976 | Northcutt . |
| 3,956,847 | 5/1976 | Bayes ................................ 43/42.45 |
| 4,074,455 | 2/1978 | Williams, Jr. . |
| 4,086,719 | 5/1978 | Robbins ................................ 43/44.9 |
| 4,138,795 | 2/1979 | Welle ................................ 43/44.9 |
| 4,177,599 | 12/1979 | Petterson ................................ 43/44.91 |
| 4,209,931 | 7/1980 | Vance ................................ 43/22 |
| 4,528,771 | 7/1985 | Rea ................................ 43/44.9 |
| 4,581,839 | 4/1986 | Mattison . |
| 4,589,221 | 5/1986 | Mattison . |
| 4,610,103 | 9/1986 | Steinman . |
| 4,638,584 | 1/1987 | Lindsay . |

FOREIGN PATENT DOCUMENTS

| | | |
|---|---|---|
| 2757998 | 6/1979 | Fed. Rep. of Germany . |
| 1594610 | 6/1970 | France . |
| 2232268 | 6/1973 | France . |
| 2231314 | 5/1974 | France . |
| 7320315 | 1/1975 | France . |
| 59225 | 4/1938 | Norway . |

OTHER PUBLICATIONS

PREVIEW 1985, New From Sevenstrand, Fishing Tackle Retailer Magazine, Jul. 1984.
DANDY-GLO, Manufactured by Dandy-Glow Tackle, Inc.

Primary Examiner—Nicholas P. Godici
Assistant Examiner—Karen Skillman
Attorney, Agent, or Firm—Seed and Berry

[57] ABSTRACT

A fising jig using a chemiluminescent capsule. The jig includes an elongated, weighted fish shaped body having a longitudinal extending cavity for receiving and holding the chemiluminescent capsule therein. The cavity has a pair of light emitting openings in the opposite sidewalls of the body communicating with the cavity. A continuous bore extends longitudinally and fully through the body from the forward to the rearward end, and a resilient tubular line guide is disposed in the bore. The line guide is a resilient Teflon tube having a lengthwise bore with a low friction, nonchaffing interior wall surface. The line guide bore is sized to loosely receive a fishing line and allows the free sliding of the jig along the line and the free rotation of the jig about the line during usage. The line guide has a resilient forward end portion extending out of the body bore at the body forward end by a distance sufficient to provide a shock absorbing action as the jig wobbles on the line during usage.

8 Claims, 1 Drawing Sheet

FISHING JIG AND METHOD OF MAKING SAME

RELATED APPLICATIONS

This application is a continuation of prior copending application Ser. No. 835,104, filed Feb. 28, 1986, entitled "Fishing Jig and Method of Making Same", now U.S. Pat. No. 4,672,766 which is a continuation-in-part of application Ser. No. 607,284, filed May 4, 1984, entitled "Fishing Lure and Entrapment Device" now U.S. Pat. No. 4,589,221, Ser. No. 648,458, filed Sept. 7, 1984, entitled "Illuminated Fishing Lure" now U.S. Pat. No. 4,581,839, and Ser. No. 813,677, filed Dec. 23, 1984, entitled "Illuminated Fishing Lure" now U.S. Pat. No. 4,693,032.

TECHNICAL FIELD

The present invention relates generally to fishing equipment, and more particularly to fishing jigs.

BACKGROUND ART

In the past, many attempts have been made to improve the ability of fishing lures to attract fish by enhancing the reflective or illuminative properties of the lures. For example, electrically powered lights, florescent paint and chemiluminescent capsules have been used. The capsules typically comprise a sealed glass tube containing a first chemical housed within an outer resilient plastic tube. A second chemical is housed intermediate the tubes. By bending the outer resilient tube, the inner glass tube can be broken to allow the two chemicals to mix and react, causing the illumination of the capsule. Chemiluminescent capsules of this type are described in detail in U.S. Pat. No. 3,576,987 to Voight, et al.

While small chemiluminescent capsules are desirable for use with fishing lures because they overcome the problems inherent with electrical and florescent systems, the use of such capsules has been hampered by the lack of an adequate means to readily attach and detach the capsules to the fishing lure and to maintain the capsule in place under the normal forces encountered on the lure during usage.

When the lure is a jig, other problems exist. A jig generally has an elongated, fish-shaped body manufactured from lead with a longitudinal bore extending from a forward end to a rearward end of the body. The bore is sized to slidably receive a fishing line. The jig rides on the fishing line just above the hook tied to the free end of the line, with a rubber cushion positioned between the jig and the hook. As will be described below, the jig tends to move back and forth along the line during use and the cushion absorbs some of the shock when the jig engages the hook and inhibits its further downward movement on the line.

To use a jig, the fisherman raises his fishing rod upward pulling the jig a short distance toward the surface, and then lowers the rod allowing the jig to fall free under its own weight until the fishing line again becomes taut. During this process, the jig generally rides up and down along the fishing line and rotates about the fishing line, causing chaffing of the line. If the jig wobbles laterally back and forth on the line as it passes through the water, additional chaffing results, particularly in the areas where the fishing line exits the ends of the jig. With enough chaffing, the fishing line is weakened to the point that it breaks under the force of a fish strike or while the fish is being pulled in. If the jig does not slide freely enough along the line, its action will not be as effective and it will not move away from the hook when a fish strikes. If the fish manages to bite not only the hook but also the lower end of the jig, the fish can throw the jig. The jig can actually assist the fish work the hook loose from its mouth. With the jig moved away from the fish, it is much more difficult for the fish to apply any force on the hook which might cause it to dislodge.

In the past, the bore in the lead body was manufactured by pouring molten lead around a wire. When the lead cooled, the wire would be pulled out leaving a long, thin body bore. Pulling the wire out was sometimes difficult, requiring great force and the bore that resulted was not as smooth as desired.

It will be appreciated that there has been a need for a fishing jig which eliminates the chaffing problem and provides improved action. Moreover, the jig should have convenient illumination means which produces a light attractive to fish. The present invention fulfills these needs and further provides other related advantages.

DISCLOSURE OF INVENTION

The present invention resides in a jig for attracting fish and a method of manufacturing the same. The jig includes an elongated, weighted body preferably having a fish shape. In a preferred embodiment, the body includes a longitudinally extending cavity in a central portion of the body at least as long as the chemiluminescent capsule for receiving and holding the capsule therein. The cavity has first and second opposed longitudinally extending and light emitting openings at opposite sides of the body communicating with the cavity. At least one of the openings is sized large enough to allow lateral passage of the capsule therethrough for positioning of the capsule in the cavity.

The invention further includes a continuous bore extending longitudinally and fully through the body from a forward end to a rearward end of the body. In a preferred embodiment the body bore is substantially straight cylindrical. A resilient tubular line guide is disposed in the body bore. The line guide has a lengthwise bore therein with a low friction, nonchaffing interior wall surface and is sized to loosely receive a fishing line. The line guide bore allows free sliding of the jig along the line and free rotation of the jig about the line during usage. In a preferred embodiment, the line guide has a resilient forward end portion extending out of the body bore at the body forward end by a distance sufficient to provide a shock absorbing action as the jig wobbles on the line during usage.

The body cavity is formed by elongated and opposed upper and lower interior planar walls spaced apart a distance substantially equal to the diameter to the chemiluminescent capsule such that a capsule with a resilient outer layer can be inserted between the walls by deforming its resilient outer layer. The body bore is positioned to intersect one of the upper or lower interior walls and form a recess running lengthwise along the wall to provide an expansion location within the cavity in which the capsule can be positioned during usage of the jig. The line guide has a continuous wall at least along a lengthwise portion thereof corresponding in position to the recess to prevent the line from passing into the body cavity when being threaded through the line guide bore.

The upper and lower interior body cavity walls have a transverse width at least as large as the diameter of the chemiluminescent capsule and the body is at least in part opaque to prevent radiation of light through the interior walls to the exterior of the body. As such, the body will prevent radiation of the light generated by the capsule except through the side openings and produce a strobe like effect as the jig rotates about the line during usage.

The mass of the body is preferably distributed about the body bore in a generally balanced arrangement. In such fashion, rotation of the jig about the line is promoted during usage.

The invention also includes a method for making the fishing jig. The method includes the steps of providing a mold with an elongated molding cavity to form the body of the jig, and a mold plug portion positioned in the mold. The mold plug forms a cavity in a central portion of the jib body to receive the chemiluminescent capsule and light emitting openings extending through the opposing sidewalls of the jig body. In another step, a Teflon tube is positioned in the mold in substantial longitudinal alignment with the jig body and extending the full length of the jig body and beyond to form a bore in the jig body extending fully through the jig body from a forward end to a rearward end. The tube is positioned with a lengthwise midportion thereof immediately adjacent to the plug portion.

Another step includes pouring molten lead into the mold and around the Teflon tube. As such, the jig body is cast with the lead being repelled by the Teflon tube in the area between the Teflon tube and the plug portion to form an elongated recess. The recess provides the expansion location within the capsule cavity at which the capsule can be positioned during usage of the jig. Since the lead does not adhere to the Teflon tube, the tube is easily removed, if desired, to leave a smooth bore in the jig body. The tube may be left in place or replaced with a new Teflon tube which serves as the line guide.

Other features and advantages of the invention will become apparent from the following detailed description, taken in conjunction with the accompanying drawings.

BEST MODE FOR CARRYING OUT THE INVENTION

Figure 1:
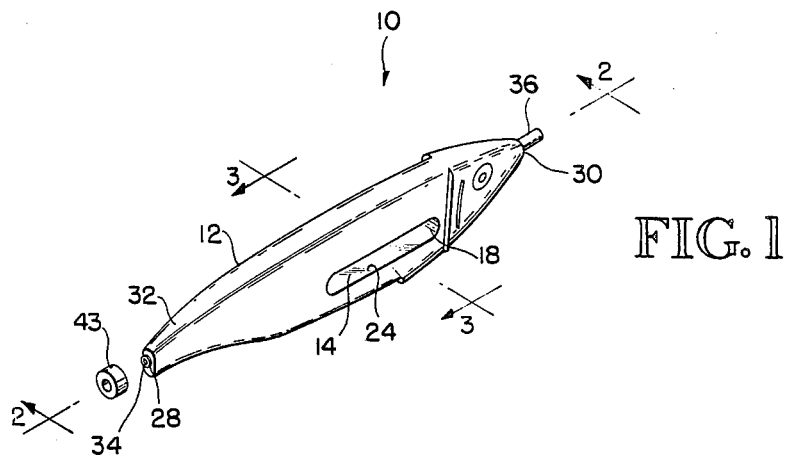
FIG. 1 is an isometric view of a fishing jig embodying the present invention, also showing a cushioning positioned on the line between the rearward end of the jig and the hook.

As shown in the drawings for purposes of illustration the present invention is embodied in a fishing jig, indicated generally by the reference numeral 10. The jig 10 has and elongated, weighted fish-shaped body 12 preferably manufactured of lead.

A longitudinally extending cavity 14 is provided in a central portion of the body 12 and has a length at least as long as the length of a chemiluminescent capsule 16 to be received and held therein. The cavity 14 is an elongated slot extending transversally and fully through the body to provide opposed longitudinally extending light emitting openings 18 and 20 in the opposite sidewalls of the body. The openings 18 and 20 communicate with the cavity 14, and are sized large enough to allow lateral passage of the capsule 16 therethrough for positioning of the capsule in the cavity 14.

The cavity 14 is formed by elongated and opposed upper and lower interior planar walls 22 and 24, respectively. The interior walls 22 and 24 are spaced apart a distance substantially equal to the diameter of the chemiluminescent capsule 16 such that a capsule with a resilient outer layer can be inserted therebetween by deforming its outer layer. A longitudinally extending recess 26 is provided in the center of the upper wall 22 and serves as an expansion location within the cavity 14 at which the capsule 16 can be positioned during usage of the jig 10. In operation, a capsule 16 can be inserted between the interior walls 22 and 24 and pushed into position within the cavity at the recess 26. The extra room provided by the recess allows the resilient capsule to expand and be retained in the cavity. Unless a sufficient force is applied to the capsule, it will tend to remain within the recess. When removal is desired, the capsule is merely pushed out of the recess and through one of the sidewall openings 18 or 20 to remove it from the jig.

The jib 10 further has a continuous, substantially straight cylindrical bore 28 extending longitudinally and fully through the body 12 from a forward end portion 30 to a rearward end portion 32. The method of forming the bore 28 will be described in more detail below, as will the method of forming the recess 26.

A resilient tubular line guide 34 comprising a length Teflon tubing is disposed within the body bore 28 and extends the full length of the body bore and has a forward end portion 36 which extends beyond the body forward end portion 30. The line guide 34 has a lengthwise central bore 38 sized to loosely and slidably receive a fishing line 40. The line 40 is threaded through the line guide 34 and has its free end tied to a hook 42, with an annular rubber cushion 43 positioned on the line between the rearward end portion 32 of the jig 10 and the hook.

The Teflon material from which the line guide 34 is manufactured provides the line guide bore 38 with a low friction, nonchaffing interior wall surface. As such, the jig 10 freely slides along the line 40 and rotates about the line during usage without chaffing the line. Since the line guide 34 prevents the line from rubbing against the edges of the body bore 28 at its openings, that source of chaffing is also eliminated.

The jig 10 slides freely enough along the line 40 that when a fish strikes at the jig and is hooked by the hook 42, the jig easily moves away from the fish and prevents the fish from using the jig to help in dislodging the hook. The free movement of the jig along the line also facilitates the action of the jig as it is worked by the fisherman when he raises his pole to pull the jig upward, and then lowers it to slack off on the line and allow the jig to drop. The jig movement provides an enticing flutter or wobbling effect. The line guide 34 also promotes rotation of the jig about the line. This is attractive to fish, and as will be described in more detail below, the rotation also produces a strobe like effect which attracts the fish. While such movement of the jig is promoted, the movement does not produce chaffing or weakening of the fishing line which can result in breakage of the line when a fish strikes or is being reeled in, or as a result of extended use of the jig. It is noted that the fit between the line guide 34 and the body bore 28 is sufficiently tight that the Teflon tube will stay within the bore during usage of the jig.

To further promote easy rotation of the jig 10 during usage, the body bore 28 is positioned toward the lengthwise axis of the jig whereabout the inertial moments of the jig are generaly balanced. In other words, the mass of the body 12 is distributed about the body bore 28 in a generally balanced arrangement to promote easy rotation of the jig about the line 40 during usage. To so position the body bore 28 for balancing and to provide enough room for the cavity 14 in which the chemiluminescent capsule 16 is positioned, the body bore must be positioned generally through the longitudinal central axis of the jig and relatively close to the cavity. By use of a continuous length of tubing for the line guide 34, even if the body bore 28 should intersect the cavity 14, the line 40 will be prevented from passing into the body cavity when it is being threaded through the jig.

In the present invention, the body bore 28 is positioned to intentionally intersect the upper interior wall 22 and form the recess 26. The recess 26 is actually an opening which extends between the cavity 14 and the body bore 28. The method of manufacturing the recess will be described below. Since the line guide 34 has a continuous wall extending the length of the recess 26 and beyond, the line 40 is prevented from passing into the cavity 14 when it is threaded through the line guide bore 38 when gearing up.

Figure 2:
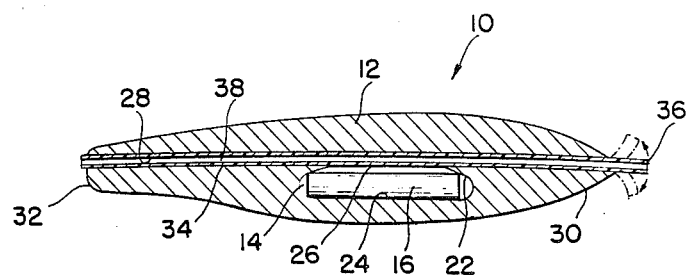
FIG. 2 is a side elevational, sectional view of the jig of FIG. 1, showing a resilient tubular line guide with the extent of movement of a forward end portion of the line guide in phantom line, and a chemiluminescent capsule positioned in a holding cavity.
Figure 3:
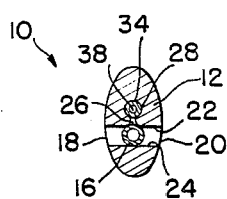
FIG. 3 is a sectional view taken substantially along the lines 3—3 of FIG. 1.
Figure 4:
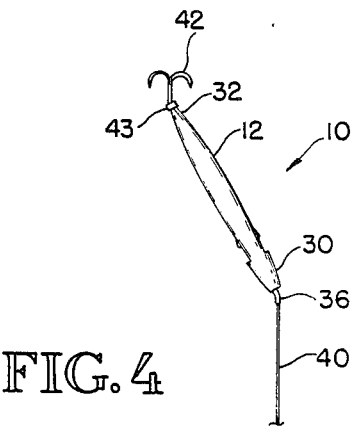
FIG. 4 is a top plan reduced sized view of the jig of FIG. 1, showing the jig mounted on a fishing line and the jig moving laterally on the fishing line.

As previously described, the line guide 34 is resilient and has a forward end portion 36 extending beyond the forward end portion 30 of the body 12. The forward line guide portion 36 extends a distance beyond the forward end portion 30 of the body 12 sufficient to provide a shock absorbing action as the jig 10 wobbles on the line 40 during usage. As such, the force the jig applies to the line is cushioned. The resiliency of the forward end portion 36 of the line guide 34 projecting beyond the body also tends to cause the jig to be biased back into longitudinal alignment with the line when it deviates too far to one side (see the phantom line extreme positions of the line guide portion 36 shown in FIG. 2). As such, when subjected to water forces during use, a desirable side-to-side or lateral wobble of the jig on the line is promoted which simulates in a desirable manner the action of a bait fish. The design also gives the jig a "wounded fish" action, spinning around the line during free fall descent, while the shock absorbing forward line guide end portion 36 promotes a highly attractive side-to-side wobble of the jig 10 during retrieval.

With the present embodiment of the invention, the body 12 is manufactured from lead which is opaque to light, and the upper and lower interior walls 22 and 24 of the cavity 14 are provided with a transverse width several times larger that the diameter of the chemiluminescent capsule 16. As such, radiation of light produced by the capsule which would otherwise pass through the upper and lower interior walls and radiate out through the body to the exterior of the jig is blocked, and the only light produced is through the sidewall openings 18 and 20. This creates a strobe like or flashing effect as the jig rotates about the line during usage. This effect is believed very attractive to fish.

The jig 10 is manufactured from lead by providing a mold (not shown) with an elongated molding cavity to form the body 12 of the jig. The mold has a mold plug portion positioned in the mold to form the cavity 14 in the central portion of the jig body. The plug portion extends transversely the full width of the mold to form the cavity 14 with the light emitting sidewall openings 18 and 20. A heat resistant Teflon tube is positioned in the mold in substantial longitudinal alignment with the body 12 and extending the full length of the body and beyond both of its ends. The tube forms the lengthwise bore 28 extending fully through the body from the forward end 30 to the rearward end 32 when the jig is cast. The Teflon tube is positioned with a lengthwise midportion thereof immediately adjacent to the plug portion of the mold.

With this arrangement, when the molten lead is poured into the mold and around the Teflon tube to cast the jig body, the lead is repelled by the Teflon tube in the area between the tube and the mold plug portion to form the elongated recess 26 which provides the expansion location for the chemiluminescent capsule 16. Since the lead does not adhered to the Teflon tube, the tube is easily removable, if desired, to leave a smooth bore in the jig body. In the presently preferred embodiment of the invention, the Teflon tube may be left in place to serve as the line guide 34, or removed and replaced with another Teflon tube having the desired length.

It will be appreciated that, although specific embodiments of the invention have been described herein for purposes of illustration, various modifications may be made without departing from the speared and scope of the invention. Accordingly, the invention is not limited except by the appended claims.

I claim:

1. A jig for attracting fish using a flexible, generally cylindrical member, comprising:

an elongated, weighted fish-shaped body;

a longitudinally extending cavity in a central portion of said body at least as long as the member for receiving and holding the member therein, said body cavity being formed by elongated and opposed upper and lower interior planar walls of said body spaced apart a distance substantially equal to the diameter of the member such that a member can be inserted snuggly therebetween by deforming its resilient outer layer, said cavity having first and second opposed longitudinally extending and light emitting openings at opposite sides of said body communicating with said cavity, at least one of said openings being sized large enough to allow lateral passage of the member therethrough for positioning of the member in said cavity;

a continuous, substantially straight cylindrical bore extending longitudinally and fully through said body from a forward end to a rearward end of said body, said body bore being positioned to intersect one of said upper or lower interior walls and form a recess running lengthwise along said wall to provide an expansion location within said cavity at which the member can be positioned during usage of the jig; and a resilient tubular line guide disposed in said body bore, said line guide having a lengthwise bore therein with a low friction, nonchaffing interior wall surface and sized to loosely receive a fishing line, said line guide bore allowing free sliding of the jig along the line and free rotation of the jig about the line during usage, said line guide extending out of said body bore beyond said body forward end and having sufficient resiliency to provide a shock-absorbing action as the jib wobbles on the line during usage.

2. The jig of claim 1 wherein said line guide has a continuous wall at least along a lengthwise portion thereof corresponding in position to said recess to prevent the line from passing into said body cavity when being threaded through said line guide bore.

3. The jig of claim 1 wherein said body bore is positioned toward the lengthwise axis of the jig whereabout the inertial movements of the jig are generally balanced, whereby the mass distribution of the jig is substantially balanced about said body bore and the jig easily rotates during usage.

4. The jig of claim 1 wherein the mass of said body is distributed about said body bore in a generally balanced arrangement to promote easy rotation of the jig about the line during usage.

5. A jig for attracting fish using an elongated member, comprising:
  an elongated, weighted body;
  a longitudinally extending cavity in said body for receiving and holding the member therein, said body cavity being formed by elongated and opposed upper and lower interior planar walls of said body spaced apart a distance substantially equal to the diameter of the member such that the member can be inserted snuggly therebetween by deforming its resilient outer layer, said cavity having at least one opening in the sidewall of said body communicating with said cavity;
  a continuous bore extending longitudinally and fully through said body from a forward end portion to a rearward end portion of said body, said body bore being positioned to intersect one of said upper or lower interior walls and form a recess running lengthwise along said wall to provide an expansion location within said cavity at which the member can be positioned during usage of the jig; and
  a tubular line guide disposed in said body bore, said line guide having a lengthwise bore therein with a low friction, nonchaffing interior wall surface and sized to loosely receive a fishing line, said line guide bore allowing free sliding of the jig along the line and free rotation of the jig about the line during usage.

6. The jig of claim 5 wherein said line guide has a resilient forward end portion extending out of said body bore at said body forward end portion by a distance sufficient to provide a shock-absorbing action as the jig wobbles on the line during usage.

7. The jig of claim 5 wherein said line guide has a continuous wall at least along a lengthwise portion thereof corresponding in position to said recess to prevent the line from passing into said body cavity when being threaded through said line guide bore.

8. The jig of claim 5 wherein the mass of said body is distributed about said body bore in a generally balanced arrangement to promote easy rotation of the jig about the line during usage.

* * * * *